June 21, 1949.                A. G. BUTLER                2,473,859
              METHOD AND APPARATUS FOR WELDING STRUCTURAL CAGES
Filed Jan. 2, 1946                                    4 Sheets-Sheet 1
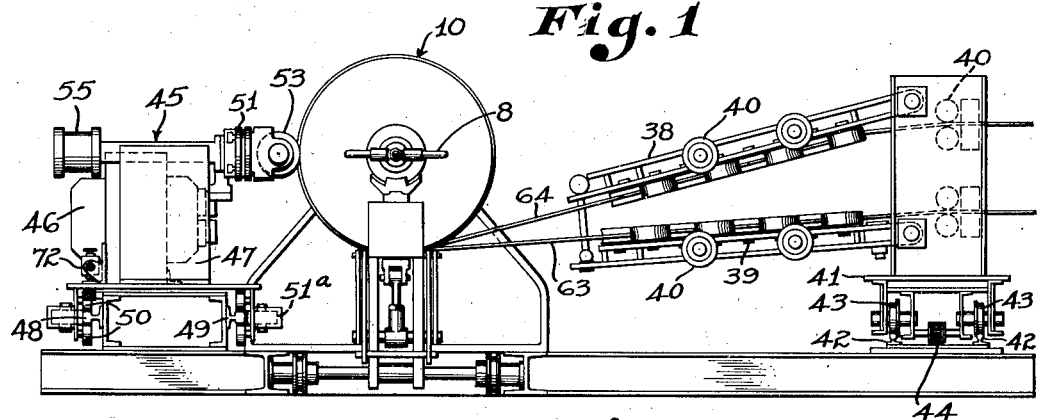
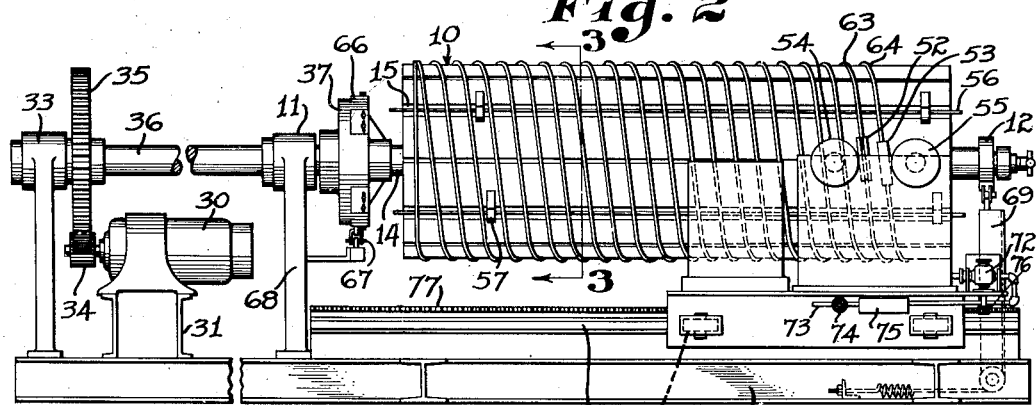
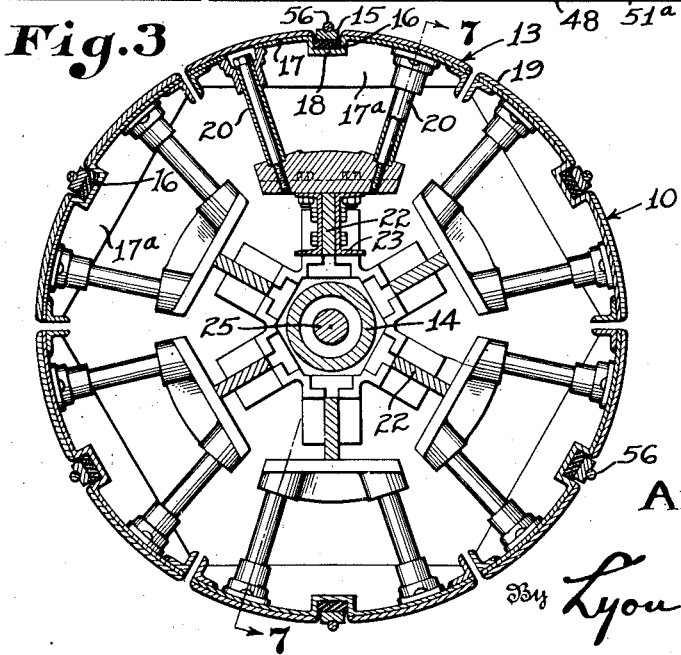
Inventor
ADOLF G. BUTLER
By Lyon & Lyon
Attorneys June 21, 1949.  A. G. BUTLER  2,473,859
METHOD AND APPARATUS FOR WELDING STRUCTURAL CAGES
Filed Jan. 2, 1946  4 Sheets-Sheet 2
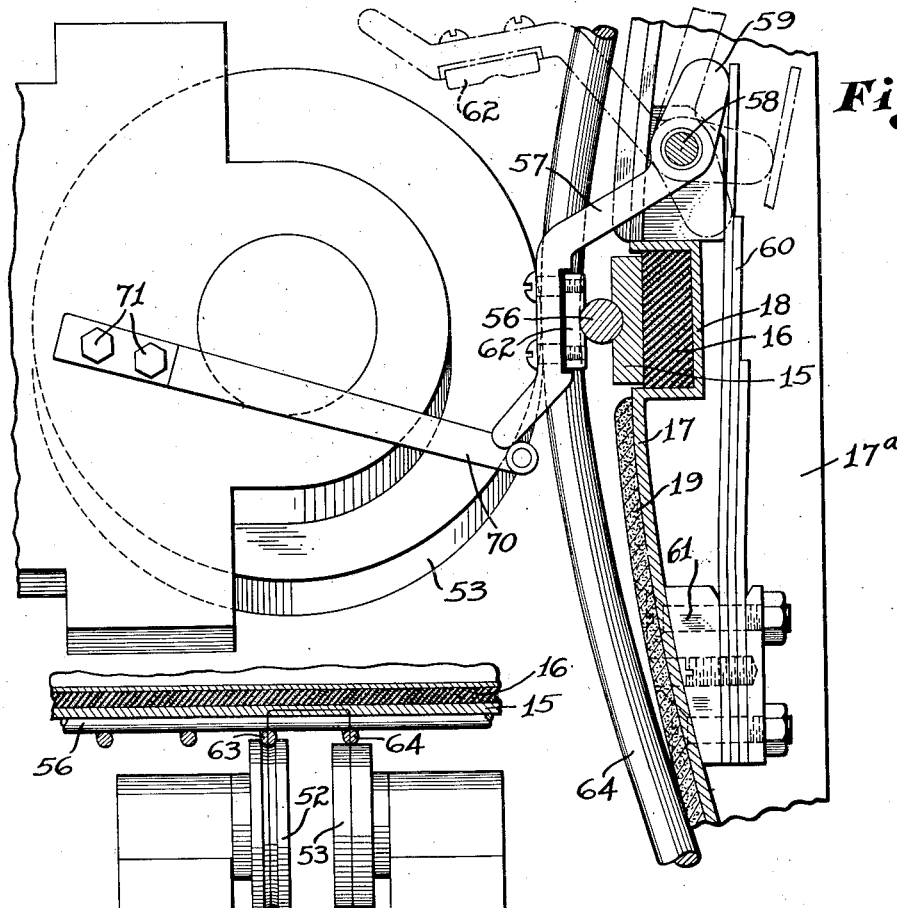
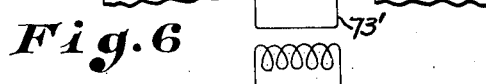
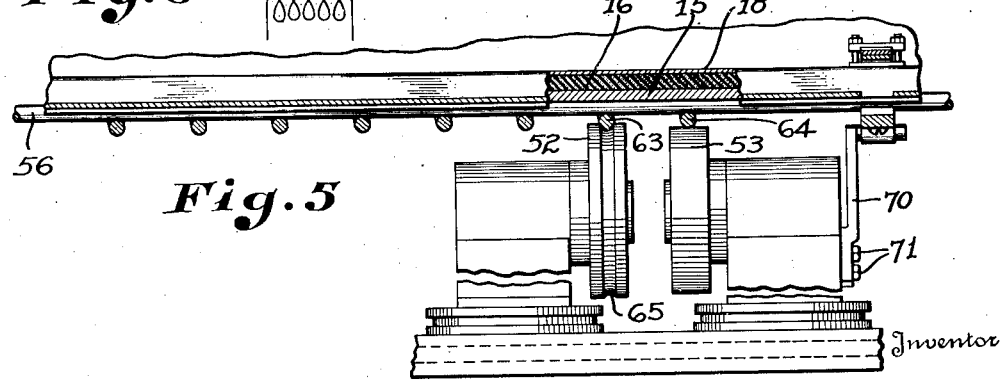
Inventor
ADOLF G. BUTLER
By Lyon & Lyon
Attorneys June 21, 1949. A. G. BUTLER 2,473,859
METHOD AND APPARATUS FOR WELDING STRUCTURAL CAGES
Filed Jan. 2, 1946 4 Sheets-Sheet 3

Inventor
ADOLF G. BUTLER
By Lyon & Lyon
Attorneys

June 21, 1949.　　　　A. G. BUTLER　　　　2,473,859
METHOD AND APPARATUS FOR WELDING STRUCTURAL CAGES
Filed Jan. 2, 1946　　　　　　　　　　　　4 Sheets-Sheet 4
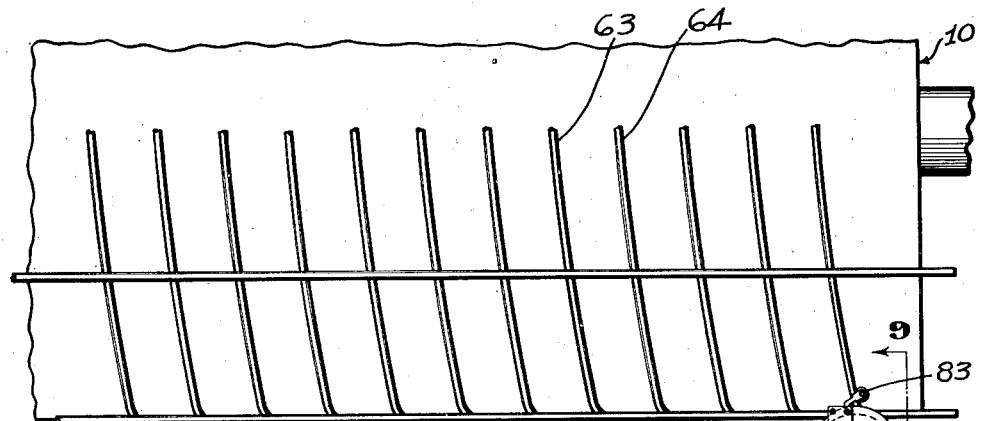
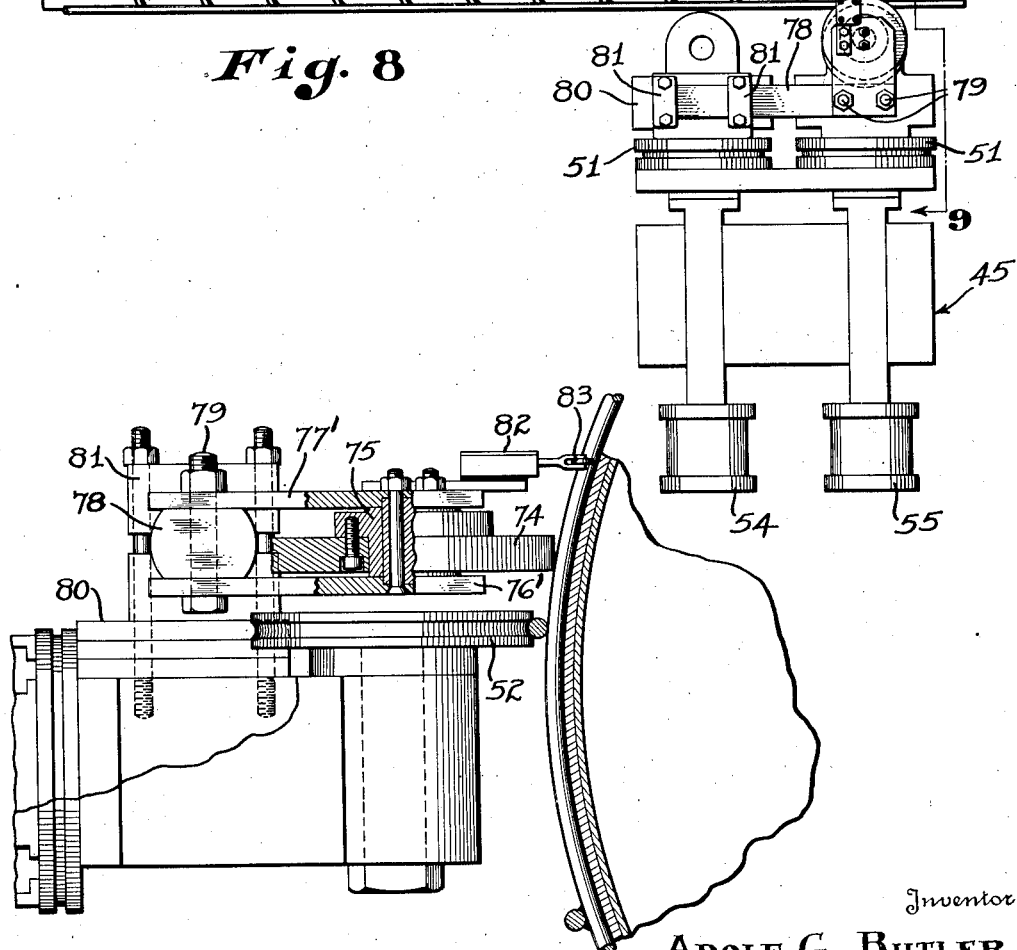
Inventor
ADOLF G. BUTLER
By Lyon & Lyon
Attorneys Patented June 21, 1949

2,473,859

UNITED STATES PATENT OFFICE 2,473,859

METHOD AND APPARATUS FOR WELDING STRUCTURAL CAGES

Adolf G. Butler, Hawthorne, Calif., assignor to American Pipe and Construction Co., Los Angeles, Calif., a corporation of Delaware Application January 2, 1946, Serial No. 638,700

7 Claims. (Cl. 219—4)

This invention relates to a method and apparatus for the welding of structural cages and is more particularly directed to the fabrication of structural reinforcing cages which may, for example, be used in the formation of concrete pipe, pillars or the like. Heretofore it has been the practice to form structural cages upon a supporting mandrel by the positioning of wires in rows around the mandrels and by the spiral wrapping of wire lengths around the cage and completing the formation of the cage by fusion or resistance welding of the different wires forming the cage structure at their junctions or points of crossing when thus positioned upon the mandrel. This operation is slow, wasteful of wire, and does not result in a properly formed cage for many uses as the mesh formed includes diagonal wires many times undesired in the cage structure.

In accordance with my invention I first position the longitudinal strands of wire forming the cage and then wrap the wires circumferentially of the supporting mandrel and perform the welding operations by resistance welding at the points of crossing of the circumferential wires over the longitudinal wires during the process of wrapping, utilizing a flow of current between the wires as the means of performing the electric welding of the respective wires at their crossings. In this way I have found that the imperfect joints formed by laying the wires one over the other enables me to perform a welding operation at the points of juncture as the current flows freely through the previously welded joints with less resistance than is occasioned by the current attempting to flow between the wires which are not welded.

It is therefore an object of my invention to provide a continuous method of forming wire cages for use in structural elements or in the constructing of columns or pipes wherein the wires themselves provide the electrical resistance coupling necessary to carry out the electric welding at the points of crossing of the wires forming the cage.

Another object and advantage of this invention is to provide a method and apparatus for the construction of wire cages which provide for the continuous formation of the cage with simultaneous welding of the points of crossing of the wires making the cage during the formation of the cage as differentiated from the positioning of the wires and then subsequently carrying out welding operations at the points of crossing of the wire.

Another object of this invention is to provide an apparatus for the welding of wire cages which is of simple construction, rapid and continuous in operation, and which permits the formation of the cage structure without loss of wire, thereby decreasing the cost of formation of such cages.

Other objects and advantages of this invention it is believed will be apparent from the following detailed description of a preferred embodiment thereof as illustrated in the accompanying drawings.

In the drawings:

Figure 1 is an end elevation of the apparatus embodying and utilized in carrying out my invention.

Figure 2 is a side elevation thereof.

Figure 3 is a sectional view taken substantially on the line 3—3 of Figure 2.

Figure 4 is a fragmental sectional view of one shoe of the mandrel upon which the cage is formed and showing the rollers of the resistance welding unit in position.

Figure 5 is a diagrammatic plan view partly in section illustrating the relationship of the rollers of the welding head to the wires of the cage.

Figure 6 is a diagrammatic view showing the welding circuit.

Figure 8 is a fragmental plan view of a modified form of device embodying my invention.

Figure 9 is a partial end view taken in the direction 9—9 as shown in Figure 8.

Figure 7:
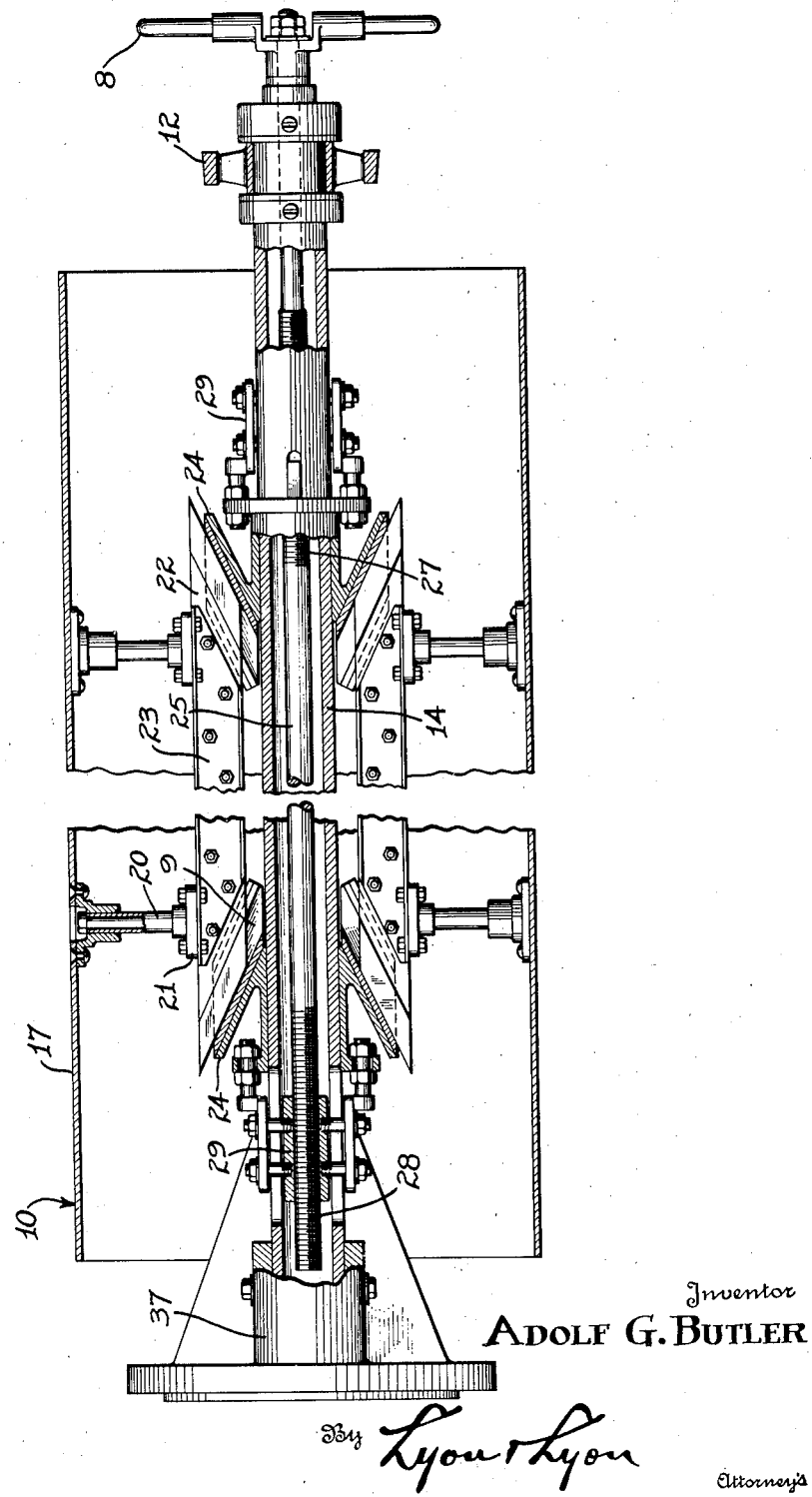
Figure 7 is a partial longitudinal sectional view of the mandrel, taken substantially on line 7—7 as shown in Figure 3.

In accordance with my invention, a means is provided for welding one or more wires around a plurality of longitudinal rods in order to form a cage. As shown in the drawings, a mandrel 10 may be provided and supported for rotation on axially spaced bearings 11 and 12. The mandrel 10 preferably comprises a number of arcuate segments 13, each of which is supported from the central hollow shaft 14. Means are provided whereby each of the segments 13 is radially adjustable with respect to the shaft 14 in order that the outer diameter of the mandrel 10 may be varied as desired.

Each of the arcuate segments 13 extends for the full length of the mandrel and each carries a copper contact piece 15 mounted on a sponge rubber pad 16. A metallic segment 17 forms a recess 18 for reception of the rubber pad 16 and copper contact 15. A surface layer 19 of electrically non-conducting material overlies the metallic segment 17 on each side of the copper contact 15 and is secured to the metallic segment 17 by machine screws (not shown). Secured to the underside of each metallic segment 17 is a stiffener 17a and a pair of tubular supports 20. These are carried by a cross web 21 secured on an adjustment bar 22 by means of the channels 23. These channels 23 extend substantially the full length of the mandrel. The adjustment bar 22 is received at its terminal ends in slots 9 formed in the cam members 24.

A central screw 25 extends through the hollow shaft 14 and is provided with right hand and left hand threads 27 and 28. The construction is such that rotation of the control screw 25 by the crossbar 8 serves to move the follower elements 29 and the cam pieces 24 axially of the mandrel 10 and thereby move the adjustment bars 22 and channels 23 radially of the hollow shaft 14. The constructional features just described are not the subject of the claims in the present application, but are described in detail in order that a clear understanding may be obtained of the particular construction utilized for moving the mandrel segments 13 radially of the central shaft 14.

Power means are provided for rotating the mandrel 10 and, as shown in the drawings, this means may include the geared motor 30 mounted on the pedestal 31, which is, in turn, supported by the base frame 32. The base frame 32 carries the bearing supports for the bearings 11, 12 and 33. The geared motor 30 is provided with a power take-off gear 34 adapted to rotate the main driving gear 35 secured upon the power shaft 36. The central shaft 14 of the mandrel 10 is connected to the power shaft 36 by means of the detachable drive coupling 37.

A means is provided for spooling one or more wires around the mandrel 10 and as shown in Figure 1, this means includes a pair of wire straighteners and tensioners 38 and 39. Each of these devices 38 and 39 carries a plurality of rollers 40, which are arranged to straighten a wire as it is unreeled from a spool (not shown). The construction of these wire feeding devices 38 and 39 constitutes no part of the subject invention, but is merely illustrative of a common form of wire feeding devices now in use. The assemblies 38 and 39 are supported upon a frame 41, which is carried upon tracks 42 extending parallel to the axis of the mandrel 10. Wheels 43 are carried in the frame 41 and roll on the tracks 42 so the wire feeding devices 38 and 39 may be positioned opposite any point along the length of the mandrel 10. An endless chain is attached to the frame 41 and is driven from a source of power (not shown) for rolling the frame 41 along the tracks 42 at a selected rate, but electrically synchronized with the mandrel 10 to impart a definite pitch to the helix formed on the mandrel 10.

On one side of the mandrel 10, opposite the location of the wire feeding devices 38 and 39, is mounted a resistance welding unit generally designated 45. This resistance welding unit 45 comprises a welding machine 46, including the usual current transformer and control means for the welding circuit. The unit 45 is supported on a frame 47 and mounted for longitudinal rolling movement along the rails 48 and 49. Upper and lower rollers 50 are provided on the frame 47 for rolling contact with the rails 48 and 49 and side rollers 51a are also carried by the frame 47 for maintaining alignment of the frame 47 with respect to the rails 48 and 49. The construction is such that the resistance welding unit 45 is mounted for movement parallel to the axis of the mandrel 10 in a manner similar to that of the wire feeding devices 38 and 39. The frame 47 supports cross head 51 upon which is mounted a pair of spaced welding rollers 52 and 53. These rollers form a part of the transformer secondary circuit and serve to carry the welding current. Insulated electrical leads (not shown) are provided for the rollers 52 and 53. The cross head 51 is urged in the direction toward the mandrel 10 by means of the air cylinders 54 and 55, which are carried on frame 47.

In the operation of this device, a plurality of rods 56 is positioned around the circumference of the mandrel 10 and one or more wires from the wire feeding units 38 and 39 are wound around the periphery of the mandrel 10 as it is rotated by the gear motor 30. Means for holding the longitudinal rods 56 with respect to the mandrel segments 13 are provided and, as shown best in Figure 4 of the drawings, this means includes a plurality of clamping levers 57 pivotally mounted at 58 upon the metallic segment 17. The clamping lever 57 carries a rearwardly extending projection 59, which is contacted by one end of the leaf spring 60. The leaf spring 60 is secured to the metallic segment 17 by means of bolts 61. A contact piece 62 carried by the lever 57 is adapted to seat on the longitudinal rod 56 and maintain it in engagement with the copper contact piece 15. The contact piece 62 is insulated from the lever 57. It will be understood from Figure 4 that the spring 60 cooperates with the projection 59 to maintain the longitudinal rod 56 in position between the contacts 62 and 15. When it is desired to release the rod 56, the lever 57 is swung about it pivot 58 in a clockwise direction, as viewed in Figure 4, until the spring 60 contacts the opposite side of the projection 59, in which latter position the lever 57 is resiliently maintained by the spring 60.

If desired, the clamp levers 57 may be manually actuated to inoperative position as the mandrel 10 is rotating, in order to prevent possible interference between the wires 63 and 64 and the levers 57 as the wires are wrapped on the mandrel 10. This operation is preferably accomplished by automatic means, however, and as shown in the drawings, the means provided includes a release arm 70 which is attached to the roller carrier by bolts 71 and functions in a manner best shown in Figures 4 and 5 to engage beneath the free end of the clamp levers 57 in advance of the rollers 52 and 53. The rotation of the mandrel 10 then serves in cooperation with the release arm 70 to move the levers 57 to inoperative position, in which position the levers 57 lie wholly beneath the surface of the mandrel 10.

After the longitudinal rods 56 have been secured in position on the contact pieces 15 carried by the mandrel segments 13, one or more wires 63, 64 are wound around the mandrel 10 from the wire feeding devices 38 and 39. The continuous wires 63 and 64 are secured at a starting position by means not shown and are wound helically around the mandrel 10 by rotation of the mandrel 10 on its axis. The wire feeding means 38 and 39 are adjusted to supply the correct tension for the wires 63 and 64. As shown in the drawings, roller 52 of the resistance welding unit is adapted to contact wire 63 and roller 53 contacts wire 64, and the rollers are supported in a position about 90° around the mandrel from the point where the wires first engage the mandrel surface. The roller position need not be at 90° from such point, but may be placed at any convenient location. The roller 52 is provided with a groove 65, which fits the contour of the continuous wire 63, and is held in contact with the wire by the air cylinders 54 and 55. Since the wire feeding devices 38 and 39 are moved parallel to the axis of the mandrel while the mandrel is rotating, the continuous wires 63 and 64 are wound helically on the mandrel. The roller 52 having the groove 65 acts as a drive means to progress the resistance welding unit along its supporting rails 48 and 49, assisted by a variable speed air motor 72. The air motor 72 receives air from a supply line 73 by way of a control valve 74 and a reservoir 75. A pinion gear 76 driven by the air motor 72 is adapted to engage a rack 77 fixed along the side of the stationary support for the rails 48. In the operation of the device the valve 74 is adjusted so that the air pressure at the air motor 72 is insufficient to cause the air motor to move the welding carriage 47 along the rails 48. The action of the air motor 72 is to assist in the translation of the carriage 47 in order to prevent undue wear on the grooved roller 52.

I have found that satisfactory welds can be made while rotating the mandrel 10 at surface speeds as high as 150 feet per minute. While the mandrel 10 is rotating and when the rollers 52 and 53 reach a preselected point in advance of one of the longitudinal rods 56, one of the initiating elements 66 mounted on the drive element 37 is brought into contact with the micro-switch 67, supported on the bearing support 68. This micro-switch 67 closes an initiating circuit in the control mechanism for the welder 46 in a manner well understood in the art. The welder then causes a high amperage welding current to flow in the secondary lead 73′ shown diagrammatically in Figure 6. The welding current flows only for about 12 cycles (using 60 cycle alternating current supply) and is timed to cut off just as the welding rollers 52 and 53 reach a position directly over the longitudinal rod 56.

This welding current flows from one roller to the other serially through the joints between the wires 63 and 64 and the longitudinal rod 56. This welding current passes, for example, from the roller 52 to the wire 63, to the rod 56, and into the copper contact piece 15. The current then flows from the contact piece 15 back into the rod 56 to the wire 64 and back to the roller 53. Since pressure is maintained on the roller by air cylinders 54 and 55, the passage of the welding current serves to resistance weld the wires 63 and 64 to the longitudinal rod 56. Both of these welds are made simultaneously. Each time that wires 63 and 64 cross over one of the longitudinal rods 56, the cross-over joints so formed are automatically resistance welded by the rollers 52 and 53 as the mandrel continuously rotates. There are as many initiating elements 66 provided as there are longitudinal rods 56.

When the continuous wires 63 and 64 have completely traversed the mandrel from end to end, the rotation of the mandrel 10 and the translation of the frame 41 are arrested. The continuous wires 63 and 64 are then severed adjacent the last resistance weld which was made. The mandrel 10 is then collapsed radially by turning the control bar 8 and hence simultaneously moving each of the segments 13 radially inwardly. The longitudinal rods remain secured to the helically wound wires 63 and 64 in the form of a completed cage, while the copper contacts 15 are thus moved radially inwardly out of engagement with the longitudinal rods 56. The completed wire cage is removed from the mandrel after the coupling unit 37 has been disengaged and to permit disconnection of the supporting bearing 12 from the post 69. The completed cage is then removed axially from the mandrel.

In the above description, it was pointed out that two continuous wires 63 and 64 can be simultaneously wound around the mandrel and two welds made simultaneously at each joint where the continuous wires 63 and 64 cross one of the longitudinal bars 56. However, it is not essential that two wires be spooled around the mandrel in this fashion. It is equally satisfactory to wind a single wire from only one of the wire tensioning devices 38, 39, and in this event, the grooved roller 52 rides on a loop of wire which has been welded at each cross-over joint before it reaches the roller 52. When only one wire is being wound around the mandrel, the wire first passes under the roller 53. Each time the wire crosses over a longitudinal rod 56 a welding current is passed from the roller 52 to the roller 53 serially through the joint which was previously welded and simultaneously through the joint to be welded. It has been found from experience that the electrical resistance at the joint previously welded is so much less than the resistance at the joint to be welded that a satisfactory bond between the continuous wire and the rod 56 is obtained at both locations. The effect of passing a welding current through a joint previously welded is such that the metallurgical characteristics of the metal at the weld are improved.

In the modification shown in Figures 8 and 9, one or more wires 63, 64 are first wrapped helically upon the mandrel 10. The longitudinal rods 56 are then welded in place on the outside of the helical wires 63, 64 instead of underneath them as described above. The resistance welding unit 45 is the same as that described above except that the roller 53 is removed and in its place is substituted a roller 74. The individual welding heads 51 are turned approximately 90° from the position illustrated in Figures 1 and 2. The roller 74 is mounted for rotation on a shaft 75 secured between horizontal plates 76′ and 77′. These plates in turn are secured to a bar 78 by means of bolt connections 79. The bar 78 extends parallel to the mandrel axis from the support 80 that is fixed relative thereto by clamping means 81. The proportions of the parts are such that the roller 74 rides above the roller 52 somewhat closer to the axis of the mandrel 10. In this arrangement the rollers are insulated relative to each other and are individually carried for dependent actuation by the air cylinders 54, 55.

The micro-switch 82 is secured to the plate 77 and carries an actuating arm 83 adapted to contact the helical wires 63, 64. In the operation of this device the welding unit 45 is caused to travel along the rails 48 by means of the air motor 72. The roller 52 contacts a longitudinal rod 56 to be welded at the intersections of each of the helical wires 63, 64. As the roller 52 is traversed along the rod 56, the arm 83 of the micro-switch 82 strikes each successive wire 63, 64 in advance of the intersection of the rod 56 with the helical wire. At the instant that the micro-switch 82 is tripped by the arm 83, the roller 74 is in contact with the helical wire 63. The micro-switch initiates the usual timing control (not shown), which in turn passes a welding current through the roller 74 to the helical wire 63, back through the intersection of the wire 63 with the rod 56 and into the grooved roller 52. The timing is such that the arm 83 on the micro-switch 82 initiates the welding current before the grooved roller 52 is directly over the intersection to be welded. The welding current is initiated while the grooved roller 52 approaches the intersection and this current is cut off when the roller 52 lies directly over the joint to be welded. The action of the air motor 72 in progressing the welding unit 45 along the rails is important in this welding operation. The valve 74 is adjusted so that the air motor 72 has sufficient power to move the carriage along the rails 48. The motion is not uniform, however, but consists of a series of accelerations and decelerations as the roller 52 on the rod 56 rides over the helical wires 63, 64. Each time that the roller 52 approaches one of the helical wires 63, 64 the increased resistance due to the roller 52 climbing over wire 63 against pressure from air ram 54 partially stalls the air motor and hence slows down the travel of the carriage. When the air pressure in the reservoir 75 reaches a sufficient intensity, the air motor develops sufficient power to move the roller 52 across one of the helical wires. It will be observed that this non-uniform motion for progressing the roller 52 along the rod 56 is particularly advantageous since in effect it slows down the motion of the roller 52 during the welding cycle and speeds up the motion between welds and thereby decreases the required over-all welding time.

Having fully described my invention, it is to be understood that I do not wish to be limited to the details herein set forth, but my invention is of the full scope of the appended claims.

I claim:

1. The method of resistance welding a cross joint between two wires comprising the steps of effecting relative motion between a wire-contacting element and the first of said wires while simultaneously maintaining the wires in contact under pressure, causing a welding current to flow through said wires and cross joint, the current being initiated before the contact element reaches the said joint, continuing the welding current while the contact element approaches the cross joint, and discontinuing the welding current when the contact element reaches the cross joint.

2. The method of resistance welding a cross joint between two wires comprising the steps of effecting relative motion between a wire-contacting roller and the first of said wires while maintaining the wires in contact under pressure, passing a welding current from the roller through the wires and the cross joint, the welding current being initiated before the roller reaches the joint, continuing the welding current as the roller approaches the cross joint, and discontinuing the welding current when the roller reaches the cross joint.

3. In a device for making a wire cage, the combination of a rotatable mandrel adapted to support a plurality of longitudinal rods spaced at intervals around the mandrel, drive means for rotating the mandrel, wire feed means cooperating with the mandrel and drive means for winding two continuous wires around the longitudinal rods, means for welding the wires and rods together at each cross-over joint where the wires cross the rods, said means including a pair of rollers adapted to contact adjacent loops of the continuous wires, and means for passing a welding current from one roller to the other serially through two joints to be welded including a switch means adapted to energize the welding circuit only at intervals, the "off" time being substantially greater than the "on" time.

4. In a device for making a wire cage, the combination of a rotatable mandrel adapted to support a plurality of longitudinal rods spaced at intervals around the mandrel, releasable latch means for holding the rods on the mandrel, drive means for rotating the mandrel, wire feed means cooperating with the mandrel and drive means for winding two continuous wires around the longitudinal rods, means for welding the wires and rods together at each cross-over joint where the wires cross the rods, said means including a pair of rollers adapted to contact adjacent loops of the continuous wires, means to progress the rollers axially of the mandrel during rotation of the latter, means for sequentially releasing the latch means in advance of the axial position of the rollers, and means for passing a welding current from one roller to another through two cross-over joints to be welded.

5. In a device for making a wire cage, the combination of a rotatable mandrel having a plurality of low-resistance contact elements extending longitudinally thereon and spaced at intervals around the mandrel, a longitudinal rod releasably secured on each contact element, drive means for rotating the mandrel, wire feed means cooperating with the mandrel and drive means for winding two continuous wires around the longitudinal rods to form joints to be welded, a pair of rollers positioned in close proximity and adapted to contact adjacent loops of the continuous wires, and means for passing a welding current from one roller to the other serially through two joints to be welded, and a contact element, said means including a switch for electrically energizing the rollers only intermittently.

6. In a device for making a wire cage, the combination of a rotatable mandrel adapted to support a plurality of longitudinal rods spaced at intervals around the mandrel, drive means for rotating the mandrel, wire feed means cooperating with the mandrel and drive means for winding two continuous wires around the longitudinal rods to form joints to be welded, a pair of rollers positioned in close proximity and adapted to contact adjacent loops of said wires, and means for passing a welding current from one roller to the other through two joints simultaneously, said means including switch means adapted to electrically energize the rollers intermittently.

7. In a device for making a wire cage consisting of longitudinal wires joined to a wire helix, the combination of a rotatable mandrel adapted to support the longitudinal wires and the helix, a resistance welding unit mounted for movement parallel to the axis of the rotatable mandrel and having a pair of rotatable electrode rollers, means to pass a welding current from one electrode roller to the other through a joint between the helix wire and one of the longitudinal wires, said means including switch means adapted to energize the electrode rollers intermittently on a relatively low duty cycle in accordance with relative movement between the welding unit and the mandrel, the electrode rollers being adapted to contact only the wires forming the cage and being maintained at close spacing to shorten the path of the welding current to a minimum.

ADOLF G. BUTLER.

REFERENCES CITED

The following references are of record in the file of this patent:

UNITED STATES PATENTS

| Number | Name | Date |
|---|---|---|
| 837,249 | Perry | Nov. 27, 1906 |
| 1,198,349 | Heany | Sept. 12, 1916 |
| 1,198,351 | Heany | Sept. 12, 1916 |
| 1,365,015 | Zwicher | Jan. 11, 1921 |
| 1,534,034 | Southwick | Apr. 21, 1925 |
| 1,642,825 | Pearce | Sept. 20, 1927 |
| 1,878,760 | Cosgrove et al. | Sept. 20, 1932 |
| 2,040,349 | Wagner | May 12, 1936 |
| 2,046,460 | Johnson | July 7, 1936 |
| 2,137,257 | White | Nov. 22, 1938 |
| 2,140,488 | White | Dec. 13, 1938 |
| 2,390,174 | Roemer | Dec. 4, 1945 |

FOREIGN PATENTS

| Number | Country | Date |
|---|---|---|
| 113,957 | Australia | Oct. 16, 1941 |